G. BRAVI.
FLOATING SUSPENSION.
APPLICATION FILED OCT. 3, 1914.
1,180,634.  Patented Apr. 25, 1916.
2 SHEETS—SHEET 1.
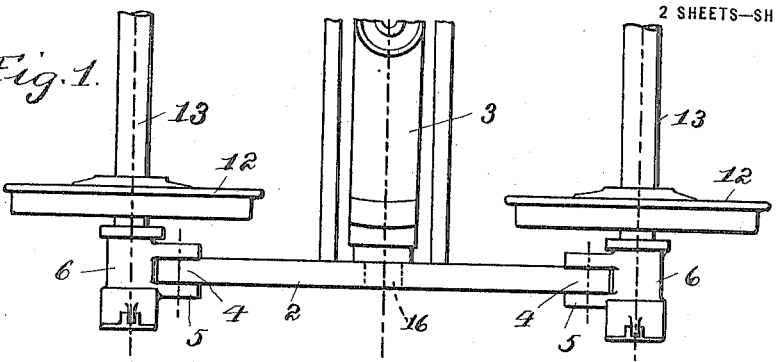
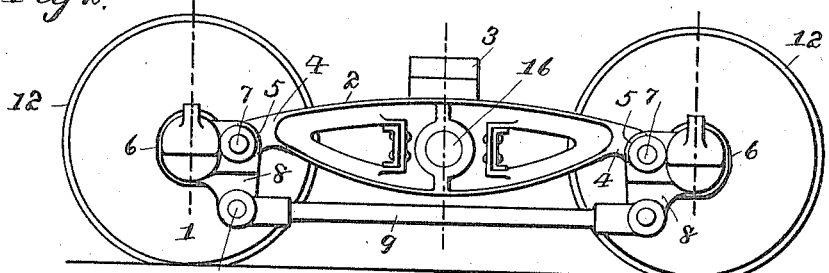
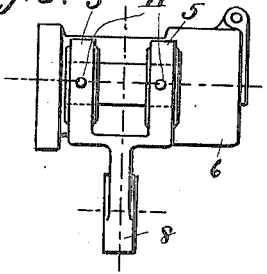 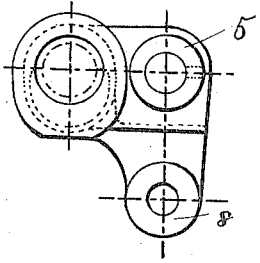 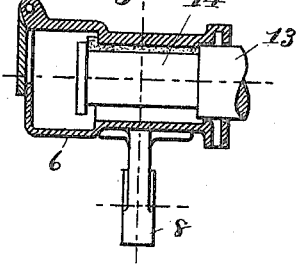
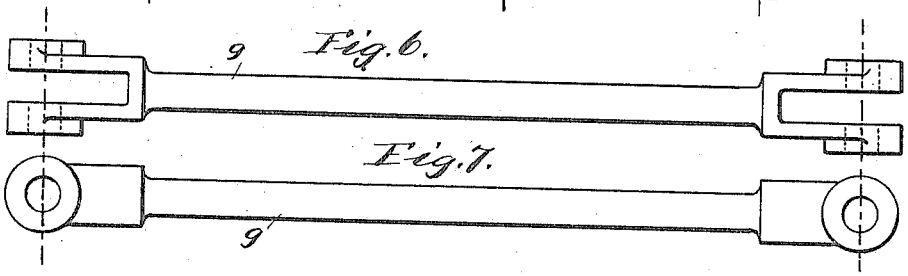
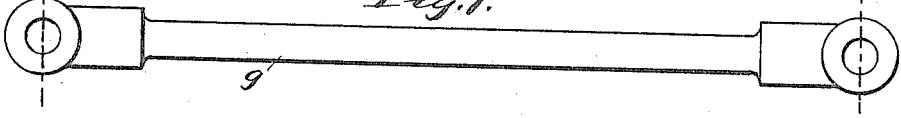
Witnesses  Inventor
  Giuseppe Bravi
By
  Attorneys

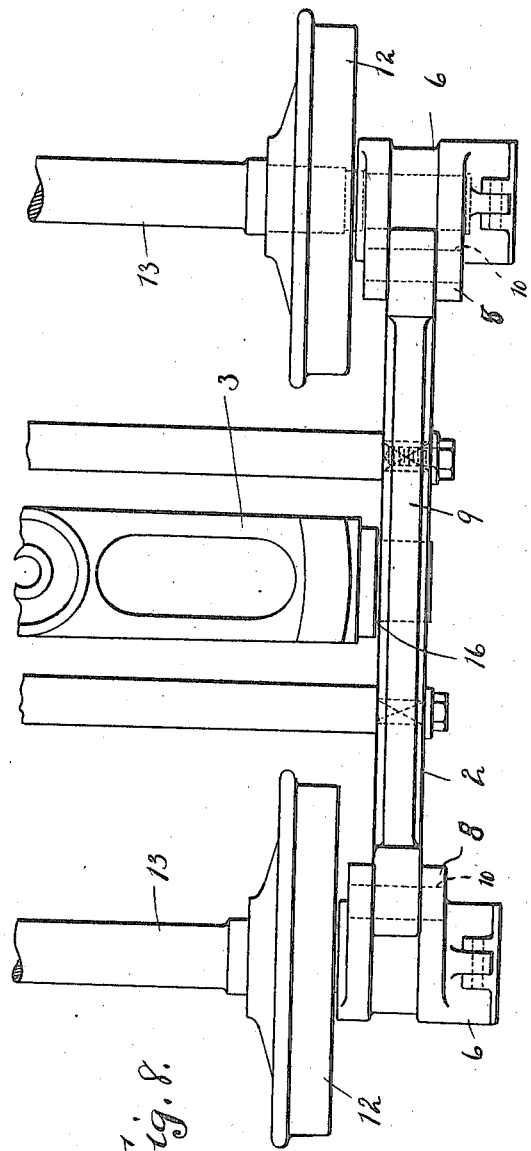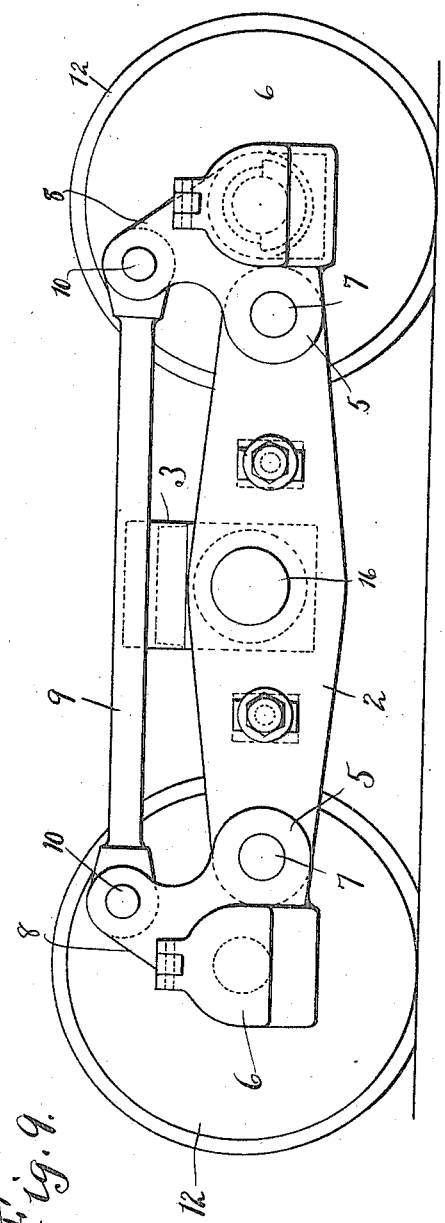

UNITED STATES PATENT OFFICE.

GIUSEPPE BRAVI, OF LANSDALE, PENNSYLVANIA, ASSIGNOR OF ONE-HALF TO SANTE T. ALLEVA, OF NORRISTOWN, PENNSYLVANIA.

FLOATING SUSPENSION.

1,180,634.     Specification of Letters Patent.     Patented Apr. 25, 1916.

Application filed October 3, 1914. Serial No. 864,794.

*To all whom it may concern:*

Be it known that I, GIUSEPPE BRAVI, a subject of the King of Italy, residing at Lansdale, in the county of Montgomery and State of Pennsylvania, have invented new and useful Improvements in Floating Suspensions, of which the following is a specification.

My invention relates to new and useful improvements in a floating suspension for vehicles, and has for its object to so construct a device as to overcome the necessity for the use of springs and other such devices to take up the shock incidental to a vehicle passing over the rails or road beds, and to keep the vehicle upon a level regardless of the up and down movement of wheels in riding over unevennesses or obstructions.

A further object of the invention is to improve upon the construction shown in my former application for patent, filed June 4, 1914, bearing Serial Number 842,872, by simplifying said construction and giving the device a wider range by increasing and balancing the movement of the truck frame relative to the journal boxes.

A still further object of the invention is to provide a connecting member which may be used either above or below the pivot points connecting the truck frame to the journal boxes.

With these ends in view this invention consists in the details of construction and combination of elements hereinafter set forth and then specifically designated by the claims.

In order that those skilled in the art to which this invention appertains, may understand how to make and use the same, I will describe its construction in detail, referring by numeral to the accompanying drawings forming a part of this specification, in which—

Figure 1, is a plan view of a portion of the truck frame made in accordance with my improvement. Fig. 2, is a side elevation thereof. Fig. 3, is an enlarged detail elevation of one of the journal boxes. Fig. 4, is an inner end view of the same. Fig. 5, is a section at the line 1—1 of Fig. 2. Fig. 6, is an enlarged plan view one of the connecting rods. Fig. 7, is a side elevation of the same. Fig. 8, is an enlarged plan view of the truck frame illustrating another form of my invention; and Fig. 9, is a side elevation thereof.

It is to be understood that my invention is applicable to various forms of trucks and the running gears of other vehicles, and that it is not my intention to limit myself to the details of construction here shown as these are only to illustrate the principle of my invention as applied to one form of truck.

In carrying out my invention as here embodied 2 represents the truck frame which is hinged or pivoted to the bolster 3 upon which latter a portion of the vehicle rests as for instance, one end of an ordinary railway car, thus giving the truck frame a see-saw movement or free swing as will be readily understood.

The ends of each side of the truck frame terminate in extensions 4 and project into the bifurcated bearings 5 of the journal boxes 6, and are pivoted thereto by a suitable bolt 7 which passes through suitable holes formed in the bifurcated bearings and extensions.

The journal boxes 6 may be of any suitable design, and have formed therewith the levers 8. These journal boxes are connected in pairs by the connecting rods 9 which are pivoted thereto by the bolts 10 passing through the bifurcated ends of the connecting rods and the ends of the levers 8. Suitable screws 11 are provided for holding the bolt 7 from accidental displacement, and corresponding screws may be used for holding the bolts 10 against such displacement.

12 represents one of a pair of wheels which is secured upon the axle 13, the journal 14 of which axle projects into the journal box in the usual manner, there being a corresponding wheel and journal upon the opposite end of each axle.

From this description it will be seen that when the truck is traveling, and the forward wheels come in contact with an obstruction, over which they ride, said forward wheels and their axle will be lifted about the pivot bolt 7, and this lifting of the forward axle will pull upon the rods 9, so as to elevate the rear end of the truck frame in the same proportion as the forward end is lowered, maintaining the load at 3 in substantially the same plane after the manner of an equalizing bar.

The swinging of the journal boxes gives a relatively long arc of movement thereby providing for the over-riding of relatively long unevennesses or obstructions.

In Figs. 8 and 9 I have shown another form of my invention, in which the connecting rod or member 9 is pivoted to the levers 8 formed with the journal boxes, said levers projecting upwardly instead of downwardly so that said connecting rod 9 is situated above the points where the truck frame is connected to the journal boxes.

In practice I have found that both ways of connecting the connecting member 9 with the journal boxes are effective, but that slightly better results are obtained when said connecting rods lie above the points where the truck frame is pivoted to the journal boxes, as the parts more quickly return to their normal positions.

In the last named construction I have also shown the ends of the connecting rods 9 as being placed between the bifurcations of the levers 8, thereby adding strength to the connecting rod or member, while at the same time reducing the weight thereof.

The cost of manufacture of the construction here shown is small on account of its simplicity, and this simplicity of construction also increases the efficiency of the device.

Of course I do not wish to be limited to the exact details of construction as herein shown, as these may be varied within the limits of the appended claims without departing from the spirit of my invention.

Having thus fully described my invention, what I claim as new and useful, is:—

1. A floating suspension for vehicles comprising a pivoted truck frame, journal boxes pivoted to the ends of the frame in pairs, and connecting rods pivoted to the journal boxes so as to cause the pairs of journal boxes to oscillate in unison.

2. In a device of the character described, a truck frame having extensions at the ends thereof, journal boxes pivoted to said extensions, wheel axles journaled in said boxes and rods pivoted to said boxes so as to space them in pairs, whereby the oscillation of one pair of boxes will cause the other pair to move in unison therewith, as specified.

3. In a device of the character described, the combination of a pivoted truck frame, extensions formed with the ends of said frame, journal boxes pivoted to said extensions, levers formed with the journal boxes, and connecting rods having both ends thereof bifurcated and pivoted to the levers as shown and described.

4. A floating suspension for vehicles comprising a truck frame, journal boxes pivoted to the ends of the frame in pairs, downwardly projecting levers carried by said journal boxes and a connecting member pivoted to said levers for oscillating the pairs of journal boxes in unison reversely.

5. A floating suspension for vehicles comprising a truck frame, journal boxes pivoted to the ends of the frame in pairs, upwardly projecting levers carried by said journal boxes and a connecting member pivoted to said levers for oscillating the pairs of journal boxes in unison.

6. A floating suspension for vehicles comprising a pair of axles, wheels on said axles, journal boxes journaled on said axles, a truck frame pivoted to the journal boxes and a connecting rod pivoted to each pair of journal boxes on the same side of the truck above the points where said truck is pivoted to the journal boxes for oscillating the pairs of journal boxes in unison reversely.

In testimony whereof, I have hereunto affixed my signature in the presence of two subscribing witnesses.

GIUSEPPE BRAVI.

Witnesses:
FRANK J. CLARK,
KATHERINE R. KIERNAN.

Copies of this patent may be obtained for five cents each, by addressing the "Commissioner of Patents, Washington, D. C."